UNITED STATES PATENT OFFICE.

EUGEN GALITZENSTEIN AND MARTIN MUGDAN, OF NUREMBERG, GERMANY, ASSIGNORS TO CONSORTIUM FÜR ELEKTROCHEMISCHE INDUSTRIE G. M. B. H., OF NUREMBERG, GERMANY.

MANUFACTURE OF PERACIDS FROM ALDEHYDES.

1,179,421.      Specification of Letters Patent.      Patented Apr. 18, 1916.

No Drawing.      Application filed August 2, 1913. Serial No. 782,700.

*To all whom it may concern:*

Be it known that we, EUGEN GALITZENSTEIN, subject of the Emperor of Austria-Hungary, and MARTIN MUGDAN, subject of the German Emperor, residing at Nuremberg, Germany, have invented certain new and useful Improvements in the Manufacture of Peracids from Aldehydes, of which the following is a specification.

Baeyer and Villiger (*Berichte der Deutsch. Chemischen Gesellschaft*, Band 33, p. 1569) have proved that per-benzoic acid is first formed in the autoxidation of benzaldehyde and that this per-acid at the moment of formation reacts with the benzaldehyde forming benzoic acid; thus no direct proof was furnished of the existence of the per-acid. These experimenters were only able to prove the transitory formation of per-benzoic acid by employing the artifice of working in presence of a so-called acceptor (see Engler, *Berichte der Deutsch. Chemischen Gesellschaft*, Band 33, p. 1097) *i. e.* a substance which reacts with the per-acid more rapidly than benzaldehyde, forming a characteristic stable compound. Since this work of Baeyer and Villiger the initial formation of per-acids in the autoxidation of aldehydes has been generally assumed although this has only been proved in the case of benzaldehyde in the manner mentioned above and it has never been found possible to detect the per-acid thus formed itself or to isolate it.

Now we have found that it is readily possible to obtain per-acids directly by the autoxidation of aldehydes, that is to prevent the simultaneous reduction of the per-acid by the aldehyde. In fact we have found that the reduction of the initially formed per-acid can be strongly inhibited by lowering the temperature. We have found further that this latter reaction is considerably accelerated by certain impurities of the aldehyde and in this connection we have found manganese compounds and water to be of particular importance. The reason for the fact that hitherto it has never proved possible to obtain per-acids by treatment of aldehydes with oxygen is thus either that the operation has been conducted at too high a temperature, or in presence of injurious impurities. We may state that we shall employ the term "injurious impurities" for the sake of brevity as comprising impurities which accelerate the reaction of the per-acid with the aldehyde, more especially manganese compounds or water.

In order to separate the per-acid which is formed, from any aldehyde which may be still present and to remove it from being acted upon by the latter, the aldehyde may for example be removed from the reaction product by evaporation, or by distillation at the lowest possible temperature; or the per-acid may be transformed into a salt for example with calcium carbonate. Further the isolation of the substance may be effected by freezing out, or in any other suitable manner.

Example 1: Dry oxygen is introduced with vigorous agitation into freshly distilled pure acetaldehyde at minus 10 to minus 20 degrees and this temperature is maintained throughout the reaction. A regular absorption of oxygen takes place. When a sample is removed from the liquid after some time and this is warmed to room temperature, a stormy reaction takes place with strong evolution of heat; the following reaction takes place:

$$CH_3CHO + CH_3CO_3H = 2CH_3COOH.$$

The freshly taken sample gives a strong precipitate of iodin with potassium iodid solution but after it has been allowed to warm spontaneously the iodin reaction ceases. After the absorption of oxygen has taken place the portion of aldehyde which is still unchanged is distilled off at or in the neighborhood of 0 degrees Cent. The peracetic acid is obtained as a paste of crystals which are only contaminated by small quantities of acetic acid.

The absorption of oxygen is preferably facilitated by radiation from a source of light which is rich in chemically active rays, for example a quartz lamp, or an iron arc lamp by which means the absorption is considerably accelerated.

Example 2: A quartz vessel is mounted on a shaking apparatus and charged with propionic aldehyde; the contents of the vessel are cooled with a mixture of ice and common salt and pure oxygen is introduced. The aldehyde is simultaneously subjected to radiation from an iron arc lamp. A regular absorption of oxygen takes place with formation of per-propionic acid. A sample which was removed gave a stormy reaction on gentle heating, especially with the addition of a trace of manganese acetate, since the per-propionic acid reacts with the excess of propionic aldehyde still present forming two molecules of propionic acid. The isolation of the per-propionic acid can be effected by working in the manner described in Example 1.

We have also found that an acceleration of the absorption of oxygen with the formation of the per-acid can be effected by the addition of catalysts, especially of small quantities of metal compounds. We may mention for example as being specially active, the compounds of chromium, cobalt, iron, uranium and vanadium. It is however, essential that even when working with catalysts care should be taken to exclude injurious impurities. Obviously the accelerating action of catalysts may be supplemented by the accelerating action of chemically active rays as described in the above example.

Example 3: Dry oxygen is introduced at a temperature of about minus 10 degrees into dry pure acetaldehyde to which has been added 0.5 per cent. by weight of cobalt acetate. The oxygen is vigorously absorbed. After some time the reaction product separates from the excess of aldehyde in the form of crystals.

It should be added that instead of oxygen it is possible to employ gases containing oxygen for example atmospheric air.

The per-acids or their salts may be employed as extremely powerful oxidizing agents, more especially for bleaching and disinfecting purposes and also for the preparation of other compounds containing active oxygen for example hydrogen per-oxid.

In the claims we shall use the expression "injurious impurities" as a compendious description of impurities like manganese compounds and water which act catalytically to accelerate the undesirable reaction between the per-acid and the aldehyde.

Claims.

1. Process for the manufacture of a per-acid comprising introducing a gas containing oxygen into an aldehyde at a temperature below 15° C.

2. Process for the manufacture of a per-acid comprising introducing oxygen into an aldehyde at a temperature below normal atmospheric temperature.

3. Process for the manufacture of a per-acid comprising causing oxygen to interact with an aldehyde at a temperature below normal atmospheric temperature.

4. Process for the manufacture of per acetic acid comprising causing oxygen to interact with acetaldehyde at a temperature below normal atmospheric temperature.

5. Process for the manufacture of per acetic acid comprising causing oxygen to interact with acetaldehyde at a temperature below 0° C.

6. Process for the manufacture of a per-acid comprising causing oxygen to interact with an aldehyde at a temperature below normal atmospheric temperature with the exclusion of injurious impurities, substantially as described.

7. Process for the manufacture of a per-acid comprising introducing oxygen into an aldehyde at a temperature below normal atmospheric temperature excluding water and manganese compounds.

8. Process for the manufacture of per acetic acid comprising introducing oxygen into acetaldehyde at a temperature below normal atmospheric temperature with the exclusion of injurious impurities, substantially as described.

9. Process for the manufacture of a per-acid comprising introducing oxygen into an aldehyde at a temperature below normal atmospheric temperature with exclusion of injurious impurities and illuminating said aldehyde with chemically active rays.

10. Process for the manufacture of a per-acid comprising introducing oxygen into an aldehyde at a temperature below normal atmospheric temperature and illuminating said aldehyde with chemically active rays.

11. Process for the manufacture of a per-acid comprising introducing oxygen into an aldehyde at a temperature below normal atmospheric temperature in presence of a suitable catalyst, substantially as described.

12. Process for the manufacture of a per-acid comprising introducing oxygen into an aldehyde at a temperature below normal atmospheric temperature with exclusion of injurious impurities and in presence of a suitable catalyst, substantially as described.

13. Process of manufacturing a per-acid comprising introducing oxygen into an aldehyde at a temperature below normal atmospheric temperature with exclusion of injurious impurities and in presence of a cobalt compound.

14. Process for the manufacture of peracetic acid comprising introducing oxygen into acetaldehyde at a temperature below normal atmospheric temperature with exclusion of injurious impurities and in presence of a cobalt compound.

15. Process for the manufacture of a per-acid comprising introducing oxygen into an aldehyde at a temperature below normal atmospheric temperature in presence of a suitable catalyst and illuminating said aldehyde with chemically active rays, substantially as described.

16. Process for the manufacture of a per-acid comprising introducing oxygen into an aldehyde at a temperature below normal atmospheric temperature with exclusion of injurious impurities and in presence of a suitable catalyst and illuminating said aldehyde with chemically active rays, substantially as described.

17. Process for the manufacture of a per-acid comprising introducing oxygen into an aldehyde at a temperature below normal atmospheric temperature with exclusion of injurious impurities and separating the per-acid so formed from any unchanged aldehyde.

18. Process for the manufacture of peracetic acid comprising introducing oxygen into acetaldehyde at a temperature below normal atmospheric temperature and distilling off the unchanged acetaldehyde below normal atmospheric temperature.

19. The process for the manufacture of a per-acid which comprises causing oxygen to interact with an aldehyde at a temperature below normal atmospheric temperature with vigorous agitation.

20. The process for the manufacture of a per-acetic acid which comprises causing oxygen to interact with acetaldehyde at a temperature below normal atmospheric temperature with vigorous agitation.

21. The process for the manufacture of per-acetic acid which comprises causing oxygen to interact with acetaldehyde at a temperature below normal atmospheric temperature with vigorous agitation and with exclusion of injurious impurities, substantially as described.

22. Process for the manufacture of per-acid comprising introducing a gas containing oxygen into an aldehyde at a temperature about and below 0° C.

23. Process for the manufacture of a per-acid comprising introducing oxygen into an aldehyde at a temperature about and below 0° C.

24. Process for the manufacture of a per-acid comprising causing oxygen to interact with an aldehyde at a temperature about and below 0° C.

25. Process for the manufacture of per acetic acid comprising causing oxygen to interact with acetaldehyde at a temperature about and below 0° C.

26. Process for the manufacture of a per-acid comprising causing oxygen to interact with an aldehyde at a temperature about and below 0° C., with the exclusion of injurious impurities, substantially as described.

27. Process for the manufacture of a per-acid comprising introducing oxygen into an aldehyde at a temperature about and below 0° C. excluding water and manganese compounds.

28. Process for the manufacture of per acetic acid comprising introducing oxygen into acetaldehyde at a temperature about and below 0° C. with the exclusion of injurious impurities, substantially as described.

29. Process for the manufacture of a per-acid comprising introducing oxygen into an aldehyde at a temperature about and below 0° C. with exclusion of injurious impurities and illuminating said aldehyde with chemically active rays.

30. Process for the manufacture of a per-acid comprising introducing oxygen into an aldehyde at a temperature about and below 0° C. and illuminating said aldehyde with chemically active rays.

31. Process for the manufacture of a per-acid comprising introducing oxygen into an aldehyde at a temperature about and below 0° C. in presence of a suitable catalyst, substantially as described.

32. Process for the manufacture of a per-acid comprising introducing oxygen into an aldehyde at a temperature about and below 0° C. with exclusion of injurious impurities and in presence of a suitable catalyst, substantially as described.

33. Process of manufacturing a per-acid comprising introducing oxygen into an aldehyde at a temperature about and below 0° C. with exclusion of injurious impurities and in presence of a cobalt compound.

34. Process for the manufacture of per acetic acid comprising introducing oxygen into acetaldehyde at a temperature about and below 0° C. with exclusion of injurious impurities and in presence of a cobalt compound.

35. Process for the manufacture of a per-acid comprising introducing oxygen into an aldehyde at a temperature about and below 0° C. in presence of a suitable catalyst and illuminating said aldehyde with chemically active rays, substantially as described.

36. Process for the manufacture of a per-acid comprising introducing oxygen into an aldehyde at a temperature about and below 0° C. with exclusion of injurious impurities and in presence of a suitable catalyst and illuminating said aldehyde with chemically active rays, substantially as described.

37. Process for the manufacture of a per-acid comprising introducing oxygen into an aldehyde at a temperature about and below 0° C. with exclusion of injurious impurities and separating the per-acid so formed from any unchanged aldehyde.

38. Process for the manufacture of per-acetic acid comprising introducing oxygen into acetaldehyde at a temperature about and below 0° C. and distilling of the unchanged acetaldehyde below 15° C.

In testimony whereof we affix our signatures in presence of two witnesses.

EUGEN GALITZENSTEIN.
MARTIN MUGDAN.

Witnesses:
ERICH BAUM,
MARTIN ERHARD.